(12) United States Patent  
Nozoe et al.

(10) Patent No.: US 11,374,217 B2  
(45) Date of Patent: Jun. 28, 2022

(54) POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

(71) Applicant: SUMITOMO OSAKA CEMENT CO., LTD., Tokyo (JP)

(72) Inventors: Tsutomu Nozoe, Chiba (JP); Toyomasa Nakano, Chiba (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 228 days.

(21) Appl. No.: 16/812,544

(22) Filed: Mar. 9, 2020

(65) Prior Publication Data

US 2021/0098781 A1 Apr. 1, 2021

(30) Foreign Application Priority Data

Sep. 26, 2019 (JP) .............................. JP2019-176146

(51) Int. Cl.
*H01M 4/36* (2006.01)
*H01M 4/133* (2010.01)
(Continued)

(52) U.S. Cl.
CPC .......... *H01M 4/366* (2013.01); *H01M 4/133* (2013.01); *H01M 4/136* (2013.01); *H01M 4/587* (2013.01);
(Continued)

(58) Field of Classification Search
None
See application file for complete search history.

(56) References Cited

U.S. PATENT DOCUMENTS

| 10,109,861 B2 | 10/2018 | Oyama et al. |
| 2009/0148771 A1 | 6/2009 | Ishii et al. |
| 2018/0097230 A1 | 4/2018 | Oyama et al. |

FOREIGN PATENT DOCUMENTS

| CN | 103247778 A | 8/2013 |
| EP | 3291343 A1 | 3/2018 |

(Continued)

OTHER PUBLICATIONS

Machine translation of Chinese Patent Publication CN103247778 (Year: 2013).*

(Continued)

*Primary Examiner* — Wyatt P Mcconnell
(74) *Attorney, Agent, or Firm* — Greenblum & Bernstein, P.L.C.

(57) ABSTRACT

A positive electrode material for a lithium ion secondary battery, including core particles and a carbonaceous film coating a surface of the core particles, in which in a Raman spectrum analysis of the carbonaceous film, in a case where a peak intensity of a spectrum in a wave number band of 1,200 to 1,400 $cm^{-1}$ is set as D, a minimum intensity of 1,400 to 1,550 $cm^{-1}$ is set as V, and a peak intensity of the spectrum of 1,550 to 1,700 $cm^{-1}$ is set as G, an average D/G is 0.77 or more and 0.98 or less and an average V/G is 0.50 or more and 0.66 or less, and in a case where the average D/G is set as a and the average V/G is set as b, X falls within a range of $-0.1 \leq X \leq 0.1$ in Expression $X = a - 1.47b$.

6 Claims, 1 Drawing Sheet

(51) Int. Cl.
  H01M 4/136    (2010.01)
  H01M 4/58     (2010.01)
  H01M 4/587    (2010.01)
  H01M 10/0525  (2010.01)
  H01M 4/02         (2006.01)

(52) U.S. Cl.
  CPC ..... H01M 4/5825 (2013.01); H01M 10/0525 (2013.01); H01M 2004/028 (2013.01)

(56) References Cited

FOREIGN PATENT DOCUMENTS

| JP | 4888411     | 2/2012  |
|----|-------------|---------|
| JP | 2013-246936 | 12/2013 |
| JP | 6077206     | 2/2017  |
| JP | 6210143     | 10/2017 |

OTHER PUBLICATIONS

Qiu et al., "Facile synthesis and electrochemical performances of secondary carbon-coated $LiFePO_4$—C composite for Li-ion capacitors based on neutral aqueous electrolytes", *J. Mater Sci. Mater Electron* (2016) 27:7255-7264.

Extended European Search Report, European Patent Office, Application No. 20161805.5, dated Jul. 14, 2020.

\* cited by examiner

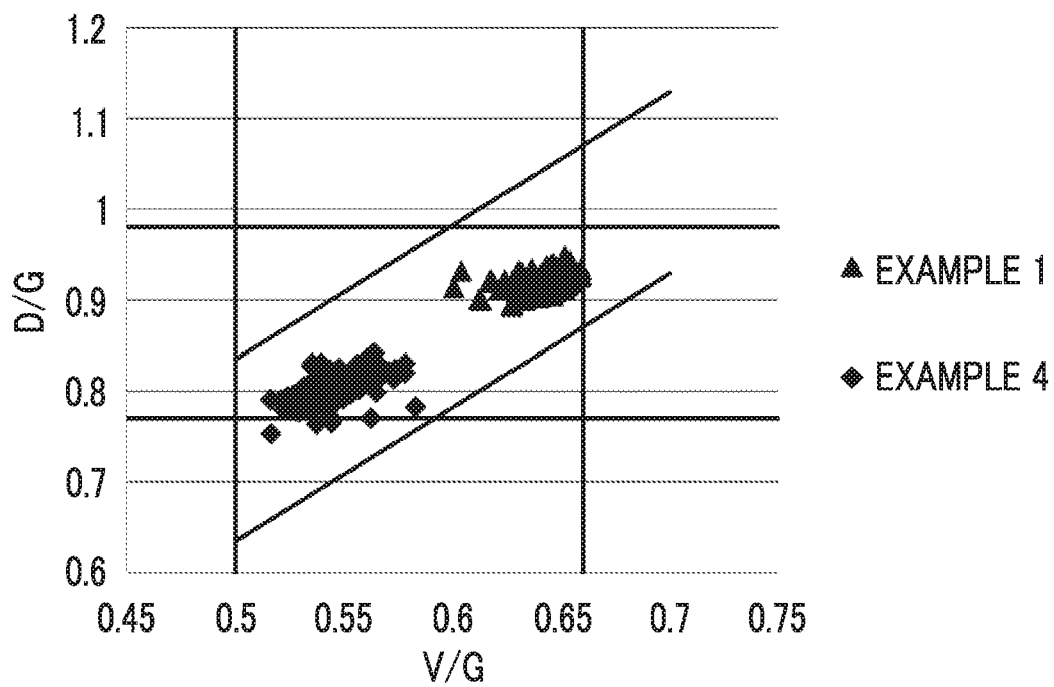
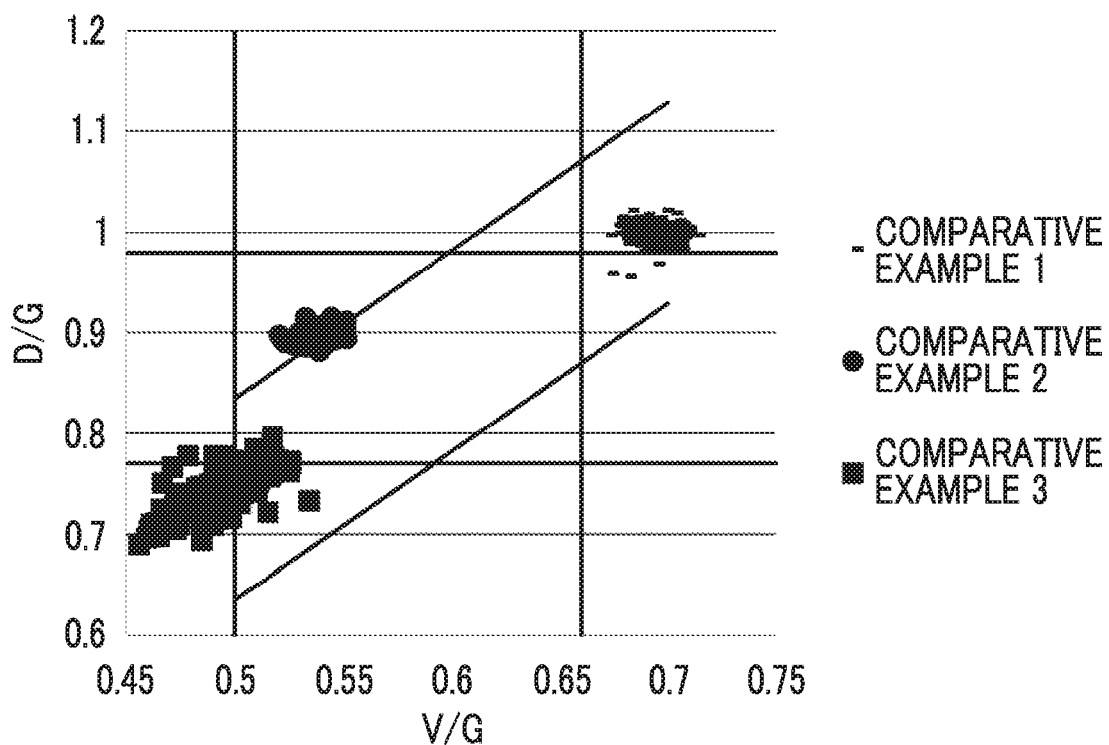

POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

BACKGROUND OF THE INVENTION

Field of the Invention

The present invention relates to a positive electrode material for a lithium ion secondary battery, a positive electrode for a lithium ion secondary battery, and a lithium ion secondary battery.

Description of Related Art

In recent years, as a small, lightweight, and high capacity battery, non-aqueous electrolyte-based secondary batteries such as lithium ion batteries have been proposed and put into practical use. A lithium ion battery is constituted of a positive electrode and a negative electrode which have a property capable of reversibly intercalating and deintercalating lithium ions, and a non-aqueous electrolyte.

Lithium ion batteries are lighter, smaller, and have higher energy than conventional secondary batteries such as lead batteries, nickel cadmium batteries, and nickel metal hydride secondary batteries, and are used as a power source in portable electronic apparatuses such as mobile phones and notebook personal computers. Recently, lithium ion batteries have also been studied as high-output power sources for electric vehicles, hybrid vehicles, electric tools and the like. High-speed charge and discharge characteristics are required for electrode active materials of the batteries which are used as the high-output power sources. In addition, an application to a large battery such as smoothing of power generation load, stationary power supply, and backup power supply is also being studied, and it is also emphasized that there is no problem of resource quantity as well as long-term safety and reliability.

Under such circumstances, for the purpose of improving electronic conductivity, Raman spectral characteristics of a positive electrode material in which the surface of the positive electrode active material is coated with a carbonaceous material have been studied (for example, Japanese Patent No. 6077206, Japanese Patent No. 6210143, and Japanese Patent No. 4888411).

SUMMARY OF THE INVENTION

In an olivine-based positive electrode material, resistance decreases as the heat treatment temperature increases until carbonization completely proceeds, and the rate characteristics are improved. However, in a case where the heat treatment temperature is too high, the olivine-based positive electrode material is decomposed and impurities are generated. Impurities generated due to the heat treatment are dissolved and re-deposited during charge and discharge and consume lithium. Further, impurities introduced before the heat treatment adversely affect the battery characteristics by, for example, causing a short-circuit during charge and discharge.

The carbonization degree of carbon can be examined by a Raman spectrum. The Raman spectrum of the heat-treated carbon mainly constituted of a peak called D band present in the vicinity of 1,350 $cm^{-1}$ and a peak called G band present in the vicinity of 1,600 $cm^{-1}$. The D band shows a breathing vibration of the condensed ring structure, and the G band shows a stretching vibration of the carbon double bond. In a case where the heat treatment temperature is increased to about 1,500° C., the G band vibration is derived from the double bond of carbon in the six-membered ring structure and obtained as a sharp peak. However, at about 500 to 1,000° C., the structures of the condensed rings are heterogenous, cyclic structures derived from aromatics and aliphatics are mixed, and the double bonds are stressed since the cyclic structures are not capable of being planar. As a result, a large number of peaks are generated and peaks are broadened.

Therefore, even in a case where a peak intensity in the D band and a peak intensity in the G band is simply compared as described in Japanese Patent No. 6077206, Japanese Patent No. 6210143, and Japanese Patent No. 4888411, the change in the carbonization state due to carbon impurities is not revealed, and thus it has not been sufficient to show the state of carbon.

In addition, it is also difficult to compare peak surface area as intensities since an optimal separation during peak separation is difficult due to the presence of a large number of broad peaks, and thus it has been difficult to examine an exact state of carbon.

The present invention has been made in consideration of the above-described circumstances, and an object of the present invention is to provide a positive electrode material for a lithium ion secondary battery capable of obtaining a lithium ion secondary battery having a high discharge capacity and excellent cycle characteristics, a positive electrode for a lithium ion secondary battery using the positive electrode material, and a lithium ion secondary battery having the positive electrode.

As a result of intensive studies to solve the above-described problems, the present inventors have found that the following matters and found that the problems can be solved.

A valley in the vicinity of 1,400 to 1,550 $cm^{-1}$ between a D band and a G band was set as a V band. Since (minimum intensity of V band spectrum)/(peak intensity of G band) (V/G) is a value corresponding to the full width at half maximum of the G band, the homogeneity of carbon double bonds is determined. (peak intensity of D band)/(peak intensity of G band) (D/G) is determined by a ratio of a breathing vibration to a stretching vibration of a condensed ring structure. The carbonization state is calculated from D/G and V/G of a Raman spectrum. D/G and V/G are numerical values that have a correlation depending on the carbonization degree, but V/G changes greatly in a case where catalytic activity due to impurities generates during carbonization and deviates from the correlation. It has been found that in a case where these two parameters are both within a specified range, the characteristics of the battery are improved.

The present invention has been completed based on such findings.

That is, the present invention provides the following [1] to [6].

[1] A positive electrode material for a lithium ion secondary battery including core particles and a carbonaceous film coating a surface of the core particles, in which in a Raman spectrum analysis of the carbonaceous film, in a case where a peak intensity of a spectrum in a wave number band of 1,200 to 1,400 $cm^{-1}$ is set as a D value, a minimum intensity of the spectrum in a wave number band of 1,400 to 1,550 $cm^{-1}$ is set as a V value, and a peak intensity of the spectrum in a wave number band of 1,550 to 1,700 $cm^{-1}$ is set as a G value, an average value of D/G is 0.77 or more and 0.98 or less and an average value of V/G is 0.50 or more and 0.66 or less, and in a case where the average value of D/G is set as a and the average value of V/G is set as b, X falls within a range of −0.1≤X≤0.1 in Expression X=a−1.47b.

[2] The positive electrode material for a lithium ion secondary battery according to [1], in which primary particles which include the core particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, 0.9<x<1.1, 0<y≤1, 0≤z<1, and 0.9<y+z<1.1) and an agglomerate of the primary particles may be included as main components.

[3] The positive electrode material for a lithium ion secondary battery according to [1] or [2], in which a carbon content is 0.9% by mass or more and 2.5% by mass or less.

[4] The positive electrode material for a lithium ion secondary battery according to any one of [1] to [3], in which a crystallite diameter analyzed by an X-ray diffraction measurement is 40 nm or more and 200 nm or less.

[5] A positive electrode for a lithium ion secondary battery, including an electrode current collector and a positive electrode mixture layer formed on the electrode current collector, in which the positive electrode mixture layer may contain the positive electrode material for a lithium ion secondary battery according to any one of [1] to [4].

[6] A lithium ion secondary battery including a positive electrode, a negative electrode, and a non-aqueous electrolyte, in which the positive electrode for a lithium ion secondary battery according to [5] may be included as the positive electrode.

According to the present invention, a positive electrode material for a lithium ion secondary battery capable of obtaining a lithium ion secondary battery having a high discharge capacity and excellent cycle characteristics, a positive electrode for a lithium ion secondary battery using the positive electrode material, and a lithium ion secondary battery having the positive electrode can be provided.

BRIEF DESCRIPTION OF THE DRAWINGS

FIG. 1 is a graph showing a plot of V/G (horizontal axis) versus D/G (vertical axis) of Raman spectral intensity ratios in Examples 1 and 4.

FIG. 2 is a graph showing a plot of V/G (horizontal axis) versus D/G (vertical axis) of Raman spectral intensity ratios in Comparative Examples 1 to 3.

DETAILED DESCRIPTION OF THE INVENTION

[Positive Electrode Material for Lithium Ion Secondary Battery]

A positive electrode material for a lithium ion secondary battery according to the present embodiment includes core particles and a carbonaceous film coating a surface of the core particles, in which in a Raman spectrum analysis of the carbonaceous film, in a case where a peak intensity of a spectrum in a wave number band of 1,200 to 1,400 $cm^{-1}$ is set as a D value, a minimum intensity of the spectrum in a wave number band of 1,400 to 1,550 $cm^{-1}$ is set as a V value, and a peak intensity of the spectrum in a wave number band of 1,550 to 1,700 $cm^{-1}$ is set as a G value, an average value of D/G is 0.77 or more and 0.98 or less and an average value of V/G is 0.50 or more and 0.66 or less, and in a case where the average value of D/G is set as a and the average value of V/G is set as b, X falls within a range of −0.1≤X≤0.1 in Expression X=a−1.47b.

Hereinafter, the positive electrode material for a lithium ion secondary battery may be simply referred to as a positive electrode material. A positive electrode for a lithium ion secondary battery may be simply referred to as a positive electrode. A lithium ion secondary battery may be simply referred to as a battery.

(Raman Spectral Characteristics)

As described above, the carbonization degree of the carbonaceous film can be examined by a Raman spectrum. From a peak intensity (D value) of a spectrum in a wave number band of 1,200 to 1,400 $cm^{-1}$, a breathing vibration of a condensed ring structure of carbon constituting a carbonaceous film can be grasped. From a peak intensity (G value) of a spectrum in a wave number band of 1,550 to 1,700 $m^{-1}$, a stretching vibration of a double bond of carbon constituting a carbonaceous film can be grasped.

In the present invention, attention has been paid to the minimum intensity (V value) of a spectrum in a wave number band of 1,400 to 1,550 $cm^{-1}$, and a method for improving battery characteristics from the relationship with the D value or G value has been found. Specifically, it has been found that X derived from an average value (b in Formula) of V/G indicating the homogeneity of the double bond of carbon and an average value (a in Formula) of D/G indicating the ratio of the breathing vibration to the stretching vibration of the condensed ring structure of carbon indicates the carbonization state of the carbonaceous film. In a case where X is −0.1 or more and 0.1 or less, the discharge capacity of the battery can be increased, and the cycle characteristics can be improved.

In a case where the average value of D/G exceeds 0.98, the cycle characteristics of the battery deteriorate. From the viewpoint of improving the cycle characteristics, the average value of D/G is preferably 0.98 or less, more preferably 0.95 or less, and still more preferably 0.92 or less.

In a case where the average value of D/G is less than 0.77, the rate characteristics of the battery deteriorate. From the viewpoint of improving the rate characteristics, the average value of D/G is preferably 0.77 or more, more preferably 0.79 or more, and still more preferably 0.81 or more.

In a case where the average value of V/G exceeds 0.66, the cycle characteristics of the battery deteriorate. From the viewpoint of improving the cycle characteristics, the average value of V/G is preferably 0.66 or less, more preferably 0.64 or less, and still more preferably 0.62 or less.

In a case where the average value of V/G is less than 0.50, the rate characteristics of the battery deteriorate. From the viewpoint of improving the rate characteristics, the average value of V/G is preferably 0.50 or more, more preferably 0.52 or more, and still more preferably 0.54 or more.

In a case where X calculated from Expression X=a−1.47b does not fall within a range of −0.1≤X≤0.1, a short-circuit occurs during cycle test. X preferably satisfies −0.07≤X≤0.09, more preferably −0.04≤X≤0.08, and still more preferably −0.01≤X≤0.07.

(Core Particle)

In the positive electrode material according to the present embodiment, it is preferable that primary particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, 0.9<x<1.1, 0<y≤0≤z<1, and 0.9<y+z<1.1), which include the core particles, and an agglomerate of the primary particles are included as main components.

"The agglomerate" means secondary particles that are an agglomerate of primary particles.

More specifically, it is preferable the positive electrode material of the present embodiment includes core particles formed of a positive electrode active material represented by General Formula $Li_xA_yD_zPO_4$ and a carbonaceous film coating the surface of the core particles, and include the primary particles of a carbonaceous-film coated positive electrode active material and an agglomerate thereof as main components.

"Main components" means that the mass of the primary particles of carbonaceous-film coated positive electrode active material and the agglomerate thereof in the positive electrode material is 70% by mass or more, preferably 80% by mass or more, more preferably 90% by mass or more, and may be 100% by mass.

General Formula $Li_xA_yD_zPO_4$ preferably has the following configuration from the viewpoint of high discharge capacity, high energy density, safety, and cycle stability.

A is at least one selected from the group consisting of Co, Mn, Ni, Fe, Cu and Cr. Among these, Mn and Fe are preferable, and Fe is more preferable.

D is at least one selected from the group consisting of Mg, Ca, Sr, Ba, Ti, Zn, B, Al, Ga, In, Si, Ge, Sc and Y. Among these, Mg, Ca, Al, and Ti are preferable.

x is greater than 0.9 and less than 1.1 (0.9<x<1.1), and 1 is preferable.

y is greater than 0 and 1 or less (0<y≤1), preferably 0.5 or more and 1 or less, and more preferably 1.

z is 0 or more and less than 1 (0≤z<1), preferably 0 or more and 0.5 or less, and more preferably 0.

As for y and z, y+z is greater than 0.9 and less than 1.1 (0.9<y+z<1.1), and 1 is preferable.

The positive electrode active material represented by above General Formula preferably has an olivine structure, and LiFePO4 and $Li(Fe_{x1}Mn_{1-x1})PO_4$ (where 0<x1<1) in which a part of Fe's is substituted with Mn in LiFePO4 are more preferable.

As the positive electrode active material represented by General Formula, a positive electrode active material produced by conventional methods such as a solid phase method, a liquid phase method and a gas phase method can be used.

$Li_xA_yD_zPO_4$ is obtained, for example, by hydrothermally synthesizing a slurry-like mixture obtained by mixing a Li source, an A source, a D source, a P source, and water, and washing the resulting precipitate with water. In addition, a similar positive electrode active material can also be obtained by generating a positive electrode active material precursor by the hydrothermal synthesis and further calcinating the positive electrode active material precursor. It is preferable to use a pressure-resistant airtight container for the hydrothermal synthesis.

Here, examples of the Li source include lithium salts such as lithium acetate ($LiCH_3COO$) and lithium chloride (LiCl), lithium hydroxide (LiOH), and the like, and it is preferable to use at least one selected from the group consisting of lithium acetate, lithium chloride, and lithium hydroxide.

Examples of the A source include chlorides, carboxylates, and sulfates, including at least one selected from the group consisting of Mn, Fe, Co, and Ni, and the like.

In a case where the A source is Fe, examples of the Fe source includes divalent iron chlorides such as iron (II) chloride ($FeCl_2$), iron (II) acetate ($Fe(CH_3COO)_2$), and iron (II) sulfate ($FeSO_4$), and it is preferable to use at least one selected from the group consisting of iron (II) chloride, iron (II) acetate, and iron (II) sulfate.

Similarly, as the D source, chlorides, carboxylates, sulfates, or the like of Mg, Ca, Sr, Ba, Ti, Zn, B, Al, Ga, In, Si, Ge, Sc, and Y, can be used.

Examples of the P source include phosphoric acid compounds such as phosphoric acid ($H_3PO_4$), ammonium dihydrogen phosphate ($NH_4H_2PO_4$), and diammonium hydrogen phosphate (($NH_4)_2HPO_4$), and it is preferable to use at least one selected from the group consisting of phosphoric acid, ammonium dihydrogen phosphate, and diammonium hydrogen phosphate.

A material amount ratio (Li:A:D:P) of the Li source, A source, D source and P source is appropriately selected so that a desired positive electrode active material is obtained and no impurities are generated.

The shape of the core particles is not particularly limited, but is preferably spherical, and particularly truly spherical. In a case where the core particles are spherical, the internal micropores of the granulated granules are easy to be uniform, and a good electrolyte solution holding ability is exhibited. In addition, by using granules, the amount of solvent in case of preparing a paste for forming a positive electrode by using the positive electrode material of the present embodiment can be reduced, and the paste for forming a positive electrode can be easily painted to the current collector. The paste for forming a positive electrode can be prepared, for example, by mixing the positive electrode material of the present embodiment, a binder resin (binding agent), and a solvent.

(Carbonaceous Film)

The carbonaceous film coating the core particles can be obtained, for example, by carbonizing an organic substance containing a saccharide and an ionic organic substance which are a raw material for the carbonaceous film.

As the saccharides, glucose, fructose, galactose, mannose, maltose, sucrose, lactose, cellulose, starch, gelatin, carboxymethylcellulose, methylcellulose, hydroxymethylcellulose, hydroxyethylcellulose, glycogen, pectin, alginic acid, glucomannan, chitin, hyaluronic acid, chondroitin, agarose, and the like are included. One type of saccharides may be used alone, and two or more types thereof may be mixed and used.

Examples of the ionic organic substances (excluding saccharides) include a polyacrylic acid, a polystyrene sulfonic acid, a polycarboxylic acid-based polymer, an alkylbenzene sulfonate, an alkyl sulfate, a carboxylic acid-modified polyvinyl alcohol salt, a sulfonic acid-modified polyvinyl alcohol salt, a polycarboxylate, a polyacrylate, a polymethacrylate, an ionic surfactant, and the like. One type of the ionic organic substances may be used alone, and two or more types thereof may be mixed and used.

Organic substances other than saccharides and ionic organic substances can be used. Organic substances other than such saccharides and ionic organic substances are not particularly limited as long as they are compounds capable of forming a carbonaceous film on the surface of the core particles. For example, a polyvinyl alcohol (PVA), a polyvinyl pyrrolidone, a polyacrylamide, a polyvinyl acetate, a polyether, a dihydric alcohol, a trihydric alcohol, a non-ionic surfactant, and the like can be suitably used.

One type of these organic substances other than such saccharides and ionic organic substances may be used alone, and two or more types thereof may be mixed and used.

In order to easily mix organic substance with the core particles and obtain a coating having a uniform carbonaceous film, the organic substance used is preferably solvent-soluble, and more preferably water-soluble in terms of ease of handling, safety, price, and the like.

The average particle diameter of the primary particles of the core particles (carbonaceous-film coated positive electrode active material) coated with the carbonaceous film is preferably 40 nm or more and 400 nm or less, more preferably 45 nm or more and 360 nm or less, and still more preferably 50 nm or more and 340 nm or less, and even still more preferably 60 nm or more and 340 nm or less.

In a case where the average particle diameter of the primary particles of the carbonaceous-film coated positive electrode active material is 40 nm or more, the amount of the binding agent necessary for forming positive electrode can be reduced, the amount of the positive electrode active material in the positive electrode is increased, and the capacity of the battery can be increased. Moreover, peeling of the carbonaceous film due to insufficient binding force can be suppressed.

On the other hand, in a case where the average particle diameter of primary particles of the carbonaceous-film coated positive electrode active material is 400 nm or less, sufficient high-speed charge and discharge performance can be obtained.

Here, the average particle diameter of primary particles is a number average particle diameter. The average particle diameter of primary particles can be determined by averaging particle diameters of 200 or more particles, which are measured by a scanning electron microscope (SEM) observation.

The thickness (average value) of the carbonaceous film coating the core particles is preferably 0.5 nm or more and 6 nm or less, more preferably 0.8 nm or more and 5 nm or less, and still more preferably 0.8 nm or more and 3 nm or less.

In a case where the thickness of the carbonaceous film is 0.5 nm or more, the increase of the total sum of the migration resistance of electrons in the carbonaceous film can be suppressed. Accordingly, the raise of the internal resistance of a lithium ion battery can be suppressed, and the voltage fall in a high-speed charge and discharge rate can be prevented.

On the other hand, in a case where the thickness of the carbonaceous film is 6 nm or less, the formation of steric hindrance that hinders lithium ions from diffusing in the carbonaceous film can be suppressed, thereby reducing the migration resistance of lithium ions. As a result, the raise of the internal resistance of a battery can be suppressed, and the voltage fall in a high-speed charge and discharge rate can be prevented.

The thickness of the carbonaceous film can be determined by photographing the carbonaceous-film coated positive electrode active material using a transmission electron microscope (TEM) or a scanning electron microscope (SEM), measuring the thickness of the carbonaceous film at 100 locations from the obtained cross-sectional image, and obtaining the average value thereof.

The coating ratio of the carbonaceous film with respect to the core particles is preferably 60% or more, and more preferably 80% or more. In a case where the coating ratio of the carbonaceous film is 60% or more, the coating effect of the carbonaceous film is fully acquired.

The coating ratio of the carbonaceous film can be determined by observing the carbonaceous-film coated positive electrode active material using a transmission electron microscope (TEM), an energy dispersive X-ray microanalyzer (EDX), or the like, calculating the ratio of a portion coating the surface of the positive electrode active material, and obtaining the average value thereof.

The density of the carbonaceous film is preferably 0.2 g/cm$^3$ or more and 2 g/cm$^3$ or less, and more preferably 0.5 g/cm$^3$ or more and 1.5 g/cm$^3$ or less. The density of the carbonaceous film is the mass per unit volume of the carbonaceous film.

In a case where the density of the carbonaceous film is 0.2 g/cm$^3$ or more, the carbonaceous film can exhibit sufficient electron conductivity. On the other hand, in a case where the density of the carbonaceous film is 2 g/cm$^3$ or less, there are a small amount of microcrystals of graphite having a layered structure in the carbonaceous film, and thus steric hindrance due to the microcrystals of graphite does not occur when lithium ions diffuse in the carbonaceous film. Accordingly, migration resistance of lithium ions does not increase. As a result, the internal resistance of the lithium ion battery does not increase, and the voltage fall in the high-speed charge and discharge rate of the lithium ion battery does not occur.

A carbon content of the positive electrode material (the carbon content contained in the positive electrode material) is preferably 0.9% by mass or more and 2.5% by mass or less, more preferably 0.9% by mass or more and 2.0% by mass or less, still more preferably 0.9% by mass or more and 1.8% by mass or less, and even still more preferably 1.0% by mass or more and 1.6% by mass or less.

In a case where the carbon content of the positive electrode material is 0.9% by mass or more, the electron conductivity can be sufficiently increased. On the other hand, in a case where the carbon content of the positive electrode material is 2.5% by mass or less, the electrode density can be sufficiently increased.

The carbon content of the positive electrode material can be measured using a carbon analyzer (for example, carbon sulfur analyzer: EMIA-810W manufactured by HORIBA, Ltd.).

The crystallite diameter of the positive electrode material analyzed by an X-ray diffraction measurement is preferably 40 nm or more and 200 nm or less.

In a case where the crystallite diameter of the positive electrode material is 40 nm or more, the amount of carbon necessary for sufficiently coating the surface of the core particles with the carbonaceous film can be suppressed. In addition, since the amount of the binding agent can be suppressed, the capacity of the battery can be increased, and the amount of the positive electrode active material therein can be increased. Moreover, peeling of the carbonaceous film due to insufficient binding force can be suppressed.

On the other hand, in a case where the crystallite diameter of the positive electrode material is 200 nm or less, the internal resistance of the positive electrode active material is suppressed, and the discharge capacity at a high speed-charge and discharge rate can be increased when a battery is formed.

The crystallite diameter of the positive electrode material is more preferably 50 nm or more and 180 nm or less, still more preferably 60 nm or more and 170 nm or less, and even still more preferably 70 nm or more and 160 nm or less.

The crystallite diameter of the positive electrode material can be calculated by a Scherrer's equation using the full width at half maximum of a diffraction peak on the (020) plane and a diffraction angle (2θ) of an X-ray diffraction pattern of the powder, which are obtained by measuring with an X-ray diffractometer (for example, RINT2000, manufactured by Rigaku Corporation).

The particle diameter (d10) having a cumulative percentage of 10% in a cumulative particle size distribution of the positive electrode material containing the agglomerated particles described above is preferably 0.5 μm or more and 5 μm or less, more preferably 0.8 μm or more and 4 μm or less, and still more preferably 1.1 μm or more and 3 μm or less.

In a case where d10 is within the above range, the paste for forming a positive electrode can be painted to an aluminum current collector, the structure of a dried positive electrode mixture layer can be formed uniform, and thus local over voltage associated with charge and discharge reaction can suppressed and an elution amount of metal can be reduced.

The particle diameter (d50) having a cumulative percentage of 50% in a cumulative particle size distribution of the positive electrode material containing agglomerated particles described above is preferably 2 μm or more and 12 μm or less, more preferably 3 μm or more and 10 μm or less, and still more preferably 3.5 μm or more and 9 μm or less.

In a case where d50 is within the above range, the paste for forming a positive electrode can be painted to an aluminum current collector, the structure of a dried positive electrode mixture layer can be formed uniform, and thus local over voltage associated with charge and discharge reaction can suppressed and an elution amount of metal can be reduced.

In addition, the particle diameter (d90) having a cumulative percentage of 90% in a cumulative particle size distribution of the positive electrode material containing agglomerated particles described above is preferably 25 μm or less, more preferably 23 μm or less, and still more preferably 20 μm or less.

In a case where d90 is 20 μm or less, the agglomerated particle diameter does not become too large with respect to the thickness of the positive electrode mixture layer, the surface of the positive electrode mixture layer is less likely to be uneven, and the structure of the positive electrode mixture layer becomes uniform.

The lower limit value of d90 is not particularly limited, but is preferably 7 μm or more.

[Method for Producing Positive Electrode Material for Lithium Ion Secondary Battery]

The method for producing a positive electrode material of the present embodiment is not particularly limited as long as the method is a method in which the positive electrode material includes core particles and a carbonaceous film coating the surface of the core particles and the Raman spectral characteristics described above can be obtained.

For example, the positive electrode material can be produced a method including; a first process of obtaining a slurry by mixing an organic substance containing a saccharide and an ionic organic substance which are a carbon source, one or more selected from a positive electrode active material and a positive electrode active material precursor, and a solvent; a second process of drying and granulating the slurry; a third process of calcinating the granulated product obtained in the second process and carbonizing the carbon source; and a fourth process of further removing impurities from the particles obtained by calcination by magnetic separation using a magnet.

It is preferable that the method for producing the positive electrode material further includes a pre-process of removing impurities from the obtained slurry by magnetic separation using a magnet after the first process and before the second process.

(First Process)

This process is a process of obtaining a slurry by mixing an organic substance containing a saccharide and an ionic organic substance which are a carbon source, one or more selected from a positive electrode active material and a positive electrode active material precursor, and a solvent.

As the saccharides, the organic substances other than saccharides, the positive electrode active material, and the positive electrode active material precursor, each of those described above can be used.

First, one or more selected from a positive electrode active material and a positive electrode active material precursor are dissolved or dispersed in a solvent to prepare a mixture. A method for dissolving or dispersing an organic substance and one or more selected from a positive electrode active material and a positive electrode active material precursor in a solvent is not particularly limited, but for example, dispersing devices such as a planetary ball mill, a vibration ball mill, a beads mill, a paint shaker, an attritor, and the like can be used.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetylacetone and cyclohexanone; amides such as dimethyl formamide, N,N-dimethylacetoacetamide, and N-methyl-2-pyrrolidinone; and glycols such as ethylene glycol, diethylene glycol, and propylene glycol. One type of these solvents may be used, and two or more types thereof may be mixed and used. Among these solvents, a preferred solvent is water.

In addition, a dispersing agent may be added as necessary.

A formulation ratio of an organic substance and one or more selected from a positive electrode active material and a positive electrode active material precursor is preferably 0.5 parts by mass or more and 10 parts by mass or less, in terms of a carbon mass obtained from the organic substance, with respect to 100 parts by mass of an active material obtained from one or more selected from the positive electrode active material and the positive electrode active material precursor. The actual formulation amount varies depending on the amount of carbonization by heating carbonization (type of carbon source, carbonization conditions, or the like), but is generally about 1 to 8 parts by mass.

In addition, in a case where an organic substance and one or more selected from a positive electrode active material and a positive electrode active material precursor are dissolved or dispersed in solvent, it is preferable that one or more selected from the positive electrode active material and the positive electrode active material precursor are mixed with the organic substance and stirred after being dispersed in solvent.

(Pre-Process)

This process is a process of removing impurities from the slurry obtained in the first process by magnetic separation using a magnet.

In a case where the impurities are removed from the slurry before calcinating a granulated product in the fourth process to be described later, V/G is prevented from deviating from the correlation with D/G, and X tends to fall within a range of $-0.1 \leq X \leq 0.1$ in above-described Expression $X = a - 1.47b$.

By removing the impurities before calcinating the granulated product, V/G is less likely to deviate from the correlation with D/G, and the occurrence of short-circuit during the cycle test can be suppressed.

The strength of the magnet is not particularly limited as long as impurities are removed from the slurry, but it is preferably 0.5 T or more and 3 T or less, more preferably 0.7 T or more and 2 T or less, and still more preferably 0.9 T or more and 1.5 T or less.

(Second Process)

This process is a process of drying and granulating the slurry.

A method for drying the slurry is not specifically limited, but for example, granulation drying methods such as spray drying, fluidized bed drying, and freeze-drying can be used.

For example, a granulated product can be obtained by drying and granulating a slurry from which impurities have been removed, using a spray dryer as the spray drying method.

(Third Process)

This process is a process of calcinating the granulated product obtained in the second process and carbonizing the carbon source.

A method for calcinating a granulated product is not specifically limited, but a furnace such as a tubular furnace, a rotary kiln, a roller hearth kiln, or the like can be used.

For example, in a case where the tubular furnace is used, the granulated product can be brought into a target calcination state by calcinating at 600° C. or higher and 1000° C. or lower.

In a case where the calcination temperature is 1,000° C. or lower, the average value of D/G is easy to be 0.98 or less, the average value of V/G is easy to be 0.66 or less, and thus a battery having excellent cycle characteristics is easily produced.

In a case where the calcination temperature is 600° C. or higher, the average value of D/G is easy to be 0.77 or more, the average value of V/G is easy to be 0.50 or more, and thus a battery having excellent rate characteristics is easily produced.

The calcination temperature is preferably 650° C. or higher and 900° C. or lower, more preferably 700° C. or higher and 850° C. or lower, and still more preferably 700° C. or higher and 800° C. or lower.

The calcination time of the granulated product is usually 1 to 24 hours, preferably 1 to 10 hours, more preferably 1 to 6 hours, and still more preferably 1 to 3 hours.

The calcination in the third process is preferably performed in a non-oxidative atmosphere. As the non-oxidative atmosphere, an inert atmosphere such as nitrogen ($N_2$) or argon (Ar) is preferable, and a reducing atmosphere containing a reducing gas such as hydrogen ($H_2$) of about several percentage by volume is preferable in a case where it is preferable to further suppress oxidation. In addition, in order to remove organic components evaporated in the non-oxidative atmosphere during heat treatment, a combustion-supporting or a combustible gas such as oxygen ($O_2$) may be introduced into the inert atmosphere.

(Fourth Process)

This process is a process of further removing impurities from the particles obtained by calcination by magnetic separation using a magnet.

By performing a treatment for removing impurities by magnetic separation after the granulated product is calcinated, it is easy to lead D/G and V/G to the preferred range described above, and it is easy to obtain a positive electrode material having an excellent carbonization degree.

The same magnet as that used in the previous process can be used as the magnet.

[Positive Electrode for Lithium Ion Secondary Battery]

The positive electrode of the present embodiment is a positive electrode for a lithium ion secondary battery, including an electrode current collector and a positive electrode mixture layer formed on the electrode current collector, and the positive electrode mixture layer contains the above-described positive electrode material for a lithium ion secondary battery of the present embodiment.

More specifically, the positive electrode of the present embodiment includes an electrode current collector formed of a meal foil and a positive electrode mixture layer formed on the electrode current collector, and the positive electrode mixture layer contains the positive electrode material for a lithium ion secondary battery of the present embodiment. That is, the positive electrode of the present embodiment is obtained by forming the positive electrode mixture layer on one main surface of the electrode current collector, using the positive electrode material for a lithium ion secondary battery of the present embodiment.

Since the positive electrode of the present embodiment includes the positive electrode material of the present embodiment, the lithium ion secondary battery using the positive electrode of the present embodiment has a high discharge capacity and excellent cycle characteristics.

In order to produce the positive electrode of the present embodiment, the positive electrode material described above, a binding agent constituted of a binder resin, and a solvent are mixed to prepare a coating material for forming a positive electrode or a paste for forming a positive electrode. At this time, conductive auxiliary agents such as carbon black, acetylene black, graphite, Ketjen black, a natural graphite, and an artificial graphite may be added as necessary.

As the binding agent, that is, the binder resin, for example, a polytetrafluoroethylene (PTFE) resin, a polyvinylidene fluoride (PVdF) resin, a fluororubber, or the like are suitably used.

The formulation ratio of the positive electrode material and the binder resin is not particularly limited, but for example, the binder resin is 1 part by mass or more and 30 parts by mass or less, and preferably 3 parts by mass or more and 20 parts by mass or less with respect to 100 parts by mass of the positive electrode material.

The solvent used for the coating material for forming a positive electrode or the paste for forming positive electrode is suitably selected according to the property of the binder resin.

Examples of the solvent include water, alcohols such as methanol, ethanol, 1-propanol, 2-propanol (isopropyl alcohol: IPA), butanol, pentanol, hexanol, octanol, diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone and cyclohexanone, amides such as dimethyl formamide, N,N-dimethylacetoacetamide, and N-methyl-2-pyrrolidinone (NMP), glycols such as ethylene glycol, diethylene glycol, and propylene glycol, and the like. One type of the solvents may be used alone, and two or more types thereof may be mixed and used.

Next, the coating material for forming a positive electrode or the paste for forming a positive electrode is coated on one surface of the metal foil, and then dried to obtain a metal foil in which a coating film containing a mixture of the above-described positive electrode material and the binder resin is formed on one surface.

Thereafter, the coating film is pressure-bonded and dried to prepare a current collector (positive electrode) having a positive electrode material layer on one surface of the metal foil.

[Lithium Ion Secondary Battery]

The lithium ion secondary battery of the present embodiment includes a positive electrode, a negative electrode, and a non-aqueous electrolyte, and includes the above-described positive electrode for a lithium ion secondary battery of the present embodiment as the positive electrode. The battery using the positive electrode of the present embodiment has a high discharge capacity and excellent cycle characteristics.

In the battery of the present embodiment, a negative electrode, an electrolyte solution, a separator, and the like are not particularly limited. For example, as the negative electrode, a negative electrode material such as a metallic Li, a carbon material, a Li alloy, $Li_4Ti_5O_{12}$, and the like can be used. A solid electrolyte may be used instead of the electrolyte solution and the separator.

EXAMPLES

Hereinafter, the present invention will be specifically described with reference to Examples and Comparative Examples. The present invention is not limited to the aspects described in Examples.

For example, in the present embodiment, acetylene black is used as a conductive auxiliary agent, but carbon materials such as carbon black, graphite, Ketjen black, a natural graphite, and an artificial graphite may be used.

In addition, batteries are evaluated using the natural graphite for the counter electrode, but naturally, other carbon materials such as an artificial graphite and coke, metal negative electrodes such as a metallic Li and a Li alloy, and oxide-based negative electrode materials such as $Li_4Ti_5O_{12}$ may be used. In addition, a mixture of ethylene carbonate and ethylmethyl carbonate in a volume ratio of 3:7, which contains 1 mol/L $LiPF_6$ as a non-aqueous electrolyte (non-aqueous electrolyte solution) is used, but $LiBF_4$, $LiClO_4$ or the like may be used instead of $LiPF_6$, or propylene carbonate, diethyl carbonate or the like may be used instead of ethylene carbonate. In addition, a solid electrolyte may be used instead of the electrolyte solution and the separator.

Production Example: Production of Positive Electrode Active Material ($LiFePO_4$)

$LiFePO_4$ was synthesized by hydrothermal synthesis as follows.

LiOH was used as a Li source, $NH_4H_2PO_4$ was used as a P source, and $FeSO_4.7H_2O$ was used as an Fe source (raw material of A in General Formula). These were mixed in pure water so that the mass ratio was to be Li:Fe:P=3:1:1, and 200 ml of a uniform slurry mixture was prepared.

Subsequently, this mixture was put into a pressure-resistant airtight container having a capacity of 500 mL, and hydrothermal synthesis was performed at 170° C. for 12 hours. After the reaction, the reaction mixture was cooled to room temperature (25° C.) to obtain a precipitated cake-like reaction product. The precipitate was sufficiently washed several times with distilled water and kept at a moisture content of 30% so as not to be dried, and the cake-like product was obtained. A small amount of the cake-like product was collected and vacuum-dried at 70° C. for 2 hours. The powder obtained was measured with an X-ray diffractometer (product name: RINT2000, manufactured by Rigaku Corporation), and it has been confirmed that $LiFePO_4$ with a single phase is formed.

Example 1

20 g of $LiFePO_4$ (positive electrode active material) obtained in Production Example and 0.73 g of sucrose as a carbon source were mixed in water so that a total amount thereof was to be 100 g, pulverized and mixed in a beads mill together with 150 g of 0.1 mmp zirconia beads, and then a slurry (mixture) having a dispersed particle diameter (d50) of 100 nm was obtained (first process).

Next, the obtained slurry was subjected to magnetic separation using a 1 T magnet to remove exogenous materials (pre-process).

Then, the slurry was dried and granulated using a spray dryer at 60° C. which was the temperature at an exit of the dryer (second process). Using a tubular furnace, the granulated powder was heat-treated (calcination) at a temperature of 770° C. for 2 hours (third process). After the heat treatment, the magnetic separation treatment was performed again using the 1 T magnet to remove impurities (fourth process), and a positive electrode material formed of a carbonaceous-film coated electrode active material was obtained.

It is noted that the carbonaceous-film coated electrode active material is formed of core particles formed of $LiFePO_4$ and a carbonaceous film and has a structure in which the surface of the core particles is coated with the carbonaceous film.

Example 2

A positive electrode material formed of the carbonaceous-film coated active material was obtained in the same manner as in Example 1 except that the calcination temperature of the tubular furnace was 730° C.

Example 3

A positive electrode material formed of the carbonaceous-film coated active material was obtained in the same manner as in Example 1 except that the magnetic separation treatment was not performed at the slurry stage (the pre-process was not performed).

Example 4

A positive electrode material formed of the carbonaceous-film coated active material was obtained in the same manner as in Example 2 except that the dispersion with the beads mill was performed until the dispersed particle diameter (d50) reached 60 nm.

Example 5

A positive electrode material formed of the carbonaceous-film coated active material was obtained in the same manner as in Example 1 except that the dispersion with the beads mill was performed until the dispersed particle diameter (d50) reached 200 nm.

Comparative Example 1

A positive electrode material formed of the carbonaceous-film coated active material was obtained in the same manner as in Example 1 except that the calcination temperature of the tubular furnace was 850° C.

Comparative Example 2

A positive electrode material formed of the carbonaceous-film coated active material was obtained in the same manner as in Example 1 except that the magnetic separation treatment was never performed (neither the pre-process nor the fourth process was performed).

Comparative Example 3

A positive electrode material formed of the carbonaceous-film coated active material was obtained in the same manner as in Example 1 except that the calcination temperature of the tubular furnace was 600° C.

<Production of Lithium Ion Battery>

The positive electrode material obtained in Examples and Comparative Examples, acetylene black (AB) as a conductive auxiliary agent, and polyvinylidene fluoride (PVdF) resin as a binding agent were mixed in N-methylpyrrolidone (NMP) at a mass ratio of positive electrode material:AB:PVdF=90:5:5 to obtain a paste for forming positive electrode. The obtained paste was coated on an aluminum foil having a thickness of 30 µm, dried, and then pressure-bonded to a predetermined density to obtain an electrode plate. The obtained electrode plate was punched into a plate shape having a coated surface area of 3×3 cm$^2$ and having a tab margin therearound, and the tab was welded to prepare a test electrode.

On the other hand, a coated electrode coated with a natural graphite was used for the counter electrode.

As the separator, a porous polypropylene film was employed.

In addition, a 1 mol/L lithium hexafluorophosphate (LiPF$_6$) solution was used as a non-aqueous electrolyte (non-aqueous electrolyte solution). As a solvent used for this LiPF$_6$ solution, a solvent in which ethylene carbonate and diethyl carbonate were mixed at a ratio of 1:1 on a volume basis and added with 1% by mass of vinylene carbonate as an additive was used.

Then, a laminate type cell was produced as the battery of Examples and Comparative Example by using the test electrode produced as described above, the counter electrode, and the non-aqueous electrolyte.

[Evaluation of Positive Electrode Material]

The physical properties of the positive electrode materials obtained in Examples and Comparative Examples and the components contained in the positive electrode materials were evaluated. The evaluation method is as follows. The results are shown in Table 1.

(1) Raman Spectral Characteristics

A Raman spectrum of the positive electrode material was measured using a Raman microscope (manufactured by HORIBA Ltd., Raman microscope XploRAPLUS). The measurement wavelength was 532 nm, and the measurement was performed between 600 and 2,000 cm$^{-1}$.

A peak intensity (peak height) of the spectrum in a wave number band of 1,200 to 1,400 cm$^{-1}$ as a D value, a minimum intensity (bottom height) of the spectrum in a wave number band of 1,400 to 1,550 cm$^{-1}$ as a V value, and a peak intensity (peak height) of the spectrum in a wave number band of 1,550 to 1,700 cm$^{-1}$ as a G value were calculated.

Each value was measured at 300 points in different fields of view of the same sample, D/G and V/G were calculated at each measurement point, and the average thereof was calculated. X was calculated by substituting the obtained average value of D/G for a and substituting the average value of V/G for b in following Expression.

$$X=a-1.47b$$

(2) Particle Size Distribution of Positive Electrode Active Material

The positive electrode material was dispersed in water, and the particle size distribution of the positive electrode material contained in the dispersion liquid was measured using a particle diameter distribution meter (trade name: LA-920, manufactured by HORIBA, Ltd.) by a method equivalent to JISZ8825 "particle size analysis-laser diffraction/scattering method".

(3) Carbon Content of Positive Electrode Material

The carbon content (% by mass) of the positive electrode material was measured using a carbon analyzer (manufactured by HORIBA, Ltd., carbon sulfur analyzer: EMIA-810W).

(4) Crystallite Diameter of Positive Electrode Material

An X-ray diffraction pattern of the powder of the positive electrode material was measured with an X-ray diffractometer (product name: RINT2000, manufactured by Rigaku Corporation). The crystallite diameter (nm) of the positive electrode material was calculated by a Scherrer's equation using the full width at half maximum of a diffraction peak on the (020) plane and a diffraction angle (2θ) of an X-ray diffraction pattern of the powder.

[Evaluation of Positive Electrode and Lithium Ion Battery]

Using the lithium ion battery obtained in Examples and Comparative Examples, the discharge capacity and the capacity retention by the cycle test were measured by the following methods. The cut-off voltage was 2.5 to 3.7 V (vs carbon negative electrode). The results are shown in Table 1.

(1) Discharge Capacity

The discharge capacity was measured by constant current charge and discharge at a discharge capacity ambient temperature of 25° C. with a charge current of 1 C and a discharge current of 10 C.

The allowable range is 112 mAh/g or more.

(2) Capacity Retention

The discharge capacity was measured by constant current charge and discharge at an ambient temperature of 25° C. with a charge current of 2 C and a discharge current of 2 C, and the measured value was taken as an initial discharge capacity. Thereafter, the ambient temperature was set to 45° C., and constant current charge and discharge was performed 600 times with a charge current of 2 C and a discharge current of 2 C. Thereafter, the discharge capacity was measured again by constant current charge and discharge at an ambient temperature of 25° C. with a charge current of 2 C and a discharge current of 2 C to obtain a discharge capacity after cycle.

The capacity retention by the cycle test was calculated as follows, cycle test capacity retention=discharge capacity after cycle/initial discharge capacity.

The allowable range is 74% or more.

TABLE 1

| | | | | Calcination temperature (° C.) | Particle size distribution | | | Carbon content (wt %) | Crystallite diameter (nm) | 10 C discharge capacity (mAh/g) | Cycle test capacity retention at 600 cycles (%) |
|---|---|---|---|---|---|---|---|---|---|---|---|
| | D/G | V/G | X | | d10 (μm) | d50 (μm) | d90 (μm) | | | | |
| Example 1 | 0.91 | 0.64 | −0.02 | 770 | 2.6 | 6.3 | 13.6 | 1.1 | 87 | 115 | 77 |
| Example 2 | 0.86 | 0.59 | 0.00 | 730 | 2.6 | 6.9 | 14.5 | 1.2 | 78 | 114 | 78 |
| Example 3 | 0.91 | 0.57 | 0.08 | 770 | 1.6 | 4.4 | 10.3 | 1.1 | 88 | 112 | 76 |
| Example 4 | 0.81 | 0.54 | 0.03 | 730 | 2.2 | 6.5 | 13.7 | 1.2 | 70 | 113 | 75 |
| Example 5 | 0.98 | 0.65 | 0.04 | 770 | 2.3 | 8.4 | 19.0 | 1.2 | 152 | 119 | 75 |
| Comparative Example 1 | 1.00 | 0.7 | −0.01 | 850 | 2.4 | 6.3 | 14.2 | 1.0 | 90 | 111 | 73 |
| Comparative Example 2 | 0.90 | 0.54 | 0.12 | 770 | 1.6 | 10.7 | 24.7 | 1.1 | 87 | 105 | Short-circuit during test |
| Comparative Example 3 | 0.75 | 0.49 | 0.04 | 600 | 2.3 | 6.2 | 13.8 | 1.3 | 72 | 95 | 78 |

(Summary of Results)

The positive electrode materials of Examples have the Raman spectral characteristics in which an average D/G is 0.77 to 0.98 and an average V/G is 0.50 to 0.66, and in which X falls within a range, $-0.1 \leq X \leq 0.1$ in Formula $X = a - 1.47b$. The batteries using these positive electrode materials had a high discharge capacity and excellent cycle characteristics.

On the other hand, the battery produced using the positive electrode material of Comparative Example 1, in which the average D/G and the average V/G exceed the predetermined upper limit of the present invention, did not fall within the allowable range although the discharge capacity was relatively large, and the capacity retention in the cycle test was decreased.

The battery produced using the positive electrode material of Comparative Example 3, in which the average D/G and the average V/G are lower than the predetermined lower limit of the present invention had a large capacity retention in the cycle test, but had a reduced discharge capacity.

In case of the battery produced using the positive electrode material of Comparative Example 2, in which V/G deviated from the correlation with D/G and X did not fall within a range of $-0.1 \leq X \leq 0.1$, a short-circuit occurred during the test, and the discharge capacity was small.

In FIG. 1 and FIG. 2, a graph showing a plot of V/G (horizontal axis) versus D/G (vertical axis) of Raman spectral intensity ratios is shown. FIG. 1 shows the results of Examples 1 and 4, and FIG. 2 shows the results of Comparative Examples 1 to 3.

In each graph, the details of each straight line are as follows.

In straight lines going up to the right, the upper one represents a straight line in a case where X is the upper limit (0.1) in Formula $X = a - 1.47b$, and the lower one represents a straight line in a case where X is the lower limit (−0.1) in Formula $X = a - 1.47b$.

In straight lines parallel to the horizontal axis, the upper one represents a straight line in a case where D/G is the upper limit (0.98), and the lower one represents a straight line in a case where D/G is the lower limit (0.77).

In straight lines parallel to the vertical axis, the right one represents a straight line in a case where V/G is the upper limit (0.66), and the left one represents a straight line in a case where V/G is the lower limit (0.50).

In Examples of FIG. 1, the plot is positioned so as to be surrounded by six straight lines on the average, whereas in Comparative Examples of FIG. 2, the plot is positioned so as to be outside of a range surrounded by six straight lines on the average.

The lithium ion secondary battery using the positive electrode material for a lithium ion secondary battery of the present invention has a high discharge capacity and excellent cycle characteristics, and thus can contribute greatly to the improvement of the reliability of lithium ion secondary batteries for applications including mobile devices.

What is claimed is:

1. A positive electrode material for a lithium ion secondary battery, the positive electrode material comprising:
   core particles; and
   a carbonaceous film coating a surface of the core particles,
   wherein in a Raman spectrum analysis of the carbonaceous film, in a case where a peak intensity of a spectrum in a wave number band of 1,200 to 1,400 cm$^{-1}$ is set as a D value, a minimum intensity of the spectrum in a wave number band of 1,400 to 1,550 cm$^{-1}$ is set as a V value, and a peak intensity of the spectrum in a wave number band of 1,550 to 1,700 cm$^{-1}$ is set as a G value, an average value of D/G is 0.77 or more and 0.98 or less and an average value of V/G is 0.54 or more and 0.66 or less, and in a case where the average value of D/G is set as a and the average value of V/G is set as b, X falls within a range of $-0.1 \leq X \leq 0.1$ in Expression $X = a - 1.47b$.

2. The positive electrode material for a lithium ion secondary battery according to claim 1, wherein primary particles which include the core particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9 < x < 1.1$, $0 < y \leq 1$, $0 \leq z < 1$, and $0.9 < y+z < 1.1$) and an agglomerate of the primary particles are included as main components.

3. The positive electrode material for a lithium ion secondary battery according to claim 1, wherein a carbon content is 0.9% by mass or more and 2.5% by mass or less.

4. The positive electrode material for a lithium ion secondary battery according to claim 1, wherein a crystallite diameter analyzed by an X-ray diffraction measurement is 40 nm or more and 200 nm or less.

5. A positive electrode for a lithium ion secondary battery, the positive electrode comprising:
- an electrode current collector; and
- a positive electrode mixture layer formed on the electrode current collector,
- wherein the positive electrode mixture layer contains the positive electrode material for a lithium ion secondary battery according to claim 1.

6. A lithium ion secondary battery comprising:
- a positive electrode;
- a negative electrode; and
- a non-aqueous electrolyte,
- wherein the positive electrode for a lithium ion secondary battery according to claim 5 is included as the positive electrode.

* * * * *